United States Patent [19]

Yamazaki et al.

[11] Patent Number: 4,662,554

[45] Date of Patent: May 5, 1987

[54] APPARATUS FOR PROCESSING PHOTOSENSITIVE MATERIAL

[75] Inventors: Seiichi Yamazaki; Kaoru Uchiyama; Toshiro Tahara, all of Kanagawa, Japan

[73] Assignee: Fuji Photo Film Co., Ltd., Kanagawa, Japan

[21] Appl. No.: 725,740

[22] Filed: Apr. 22, 1985

[30] Foreign Application Priority Data

May 18, 1984 [JP] Japan ................................ 59-10089

[51] Int. Cl.[4] ...................... B65H 5/02; B65H 20/16; B65H 20/24; G03B 1/56

[52] U.S. Cl. ..................................... 226/170; 226/92; 226/113; 226/181; 271/277

[58] Field of Search ................. 226/6, 12, 91, 92, 170, 226/181, 113; 271/277; 414/20; 198/803.01, 465.3, 465.1; 354/321

[56] References Cited

U.S. PATENT DOCUMENTS 2,926,908 3/1960 Bobst ............................ 271/277 X
4,462,588 7/1984 Kogane .......................... 271/277 X
4,540,324 9/1985 Kogane et al. .................. 226/92 X

*Primary Examiner*—Stuart S. Levy
*Assistant Examiner*—Lynn M. Sohacki
*Attorney, Agent, or Firm*—Sughrue, Mion, Zinn, Macpeak and Seas

[57] ABSTRACT

A clip 12 is engaged with the leading end portion of a photosensitive material 10 of continuous length which has been printed with images. The clip is propelled by a driving force to convey the photosensitive material. In a clip removing device 56, rotating arms 66 bend the leading end portion of the photosensitive material in the direction of the thickness thereof such that the leading end portion is disengaged from the clip. The photosensitive material is then fed by rollers 72, 74, 80, 82 to a subsequent stage 87 where it is cut off.

21 Claims, 4 Drawing Figures

APPARATUS FOR PROCESSING PHOTOSENSITIVE MATERIAL

BACKGROUND OF THE INVENTION

1. Field of the Invention

The present invention relates to an apparatus for processing a photosensitive material, such as a photographic paper. More particularly, the invention pertains to a photosensitive material processing apparatus in which a photosensitive material is conveyed therethrough by means of a clip which is attached to the leading end portion of the photosensitive material and is driven, the clip being removed from the photosensitive material before it is fed to a subsequent step.

2. Description of the Prior Art

A typical conventional apparatus of the type described above has been arranged such that a photographic paper is conveyed through the inside of the apparatus by means of a clip which is engaged with openings formed at the leading end portion of the photographic paper and is driven by clip driving means.

After the photographic paper has been printed, its leading end portion which is engaged with the clip is cut off, and the photographic paper is fed to a cutter through a buffer portion for the purpose of adjusting its speed, where it is cut into the individual image frames which are then fed to a subsequent step.

Accordingly, the conventional processing apparatus requires a cutter for cutting the leading end portion of the photographic paper for the purpose of removing the clip. Further, to reuse the clip, it is inconveniently necessary to remove the clip from the cut leading end portion of the photographic paper.

SUMMARY OF THE INVENTION

In view of the above-described situation, a primary object of the present invention is to provide a photosensitive material processing apparatus capable of removing the clip without cutting the leading end portion of a photosensitive material.

To this end, according to the invention, there is provided a photosensitive material processing apparatus comprising: a clip adapted to clamp the leading end portion of a photosensitive material of continuous length and to engage with an opening formed at the leading end portion; clip driving means for pulling the photosensitive material in its longitudinal direction by retaining portions of the clip near its longitudinal ends; clip removing means for releasing the engagement of the clip with the opening by partially bending the leading end portion of the photosensitive material in the direction of its thickness; and photosensitive material driving means for conveying the photosensitive material by applying a driving force to it while being clamped by the photosensitive material driving means after the clip has been removed from the clip driving means, whereby it is possible to remove the clip from the leading end portion of the photosensitive material by the clip removing means without cutting the photosensitive material.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 2:
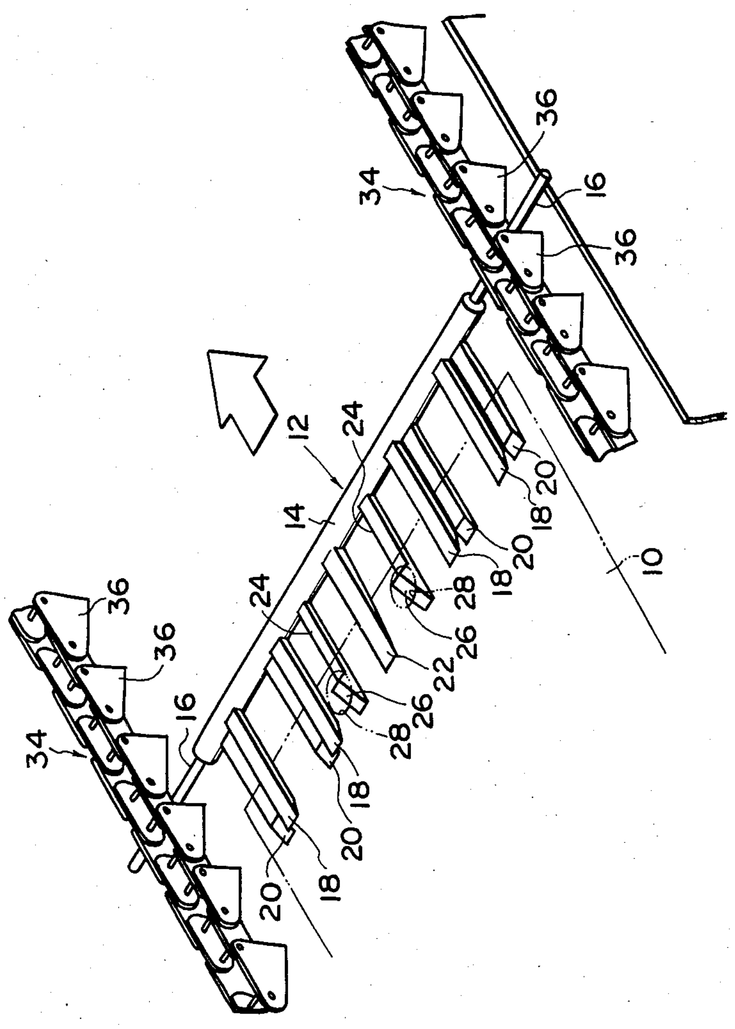
FIG. 2 is a perspective view of a clip employed in the apparatus shown in FIG. 1 in a state wherein the clip is being driven by a driving chain.

Referring to the drawings, FIG. 2 shows a clip 12 which is engaged with the leading end portion of a photographic paper 10 serving as a photosensitive material. The clip 12 includes a cylindrical portion 14 of a synthetic resin which has support shafts 16 respectively projecting from its longitudinal ends. Further, a plurality of clamping arms 18 and 20 project from the cylindrical portion 14 in pairs at proper spacings. The arrangement is such that the leading end portion of the photographic paper 10 is clamped between the pairs of clamping arms 18 and 20. In addition, a press arm 22 projects from the longitudinally central portion of the cylindrical portion 14 such as to abut against one side of the photographic paper 10. Further, a pair of retainer arms 24 project from the cylindrical portion 14 on both sides of the press arm 22. Substantially triangular hooks 26 which are formed at the respective distal ends of the retainer arms 24 are respectively inserted into openings 28 formed at the leading end portion of the photographic paper 10 from the surface thereof which is opposite to the press arm 22.

Accordingly, when the photographic paper 10 has its leading end portion inserted between the clamping arms 18 and 20, the openings 28 are engaged with the corresponding hooks 26 by virtue of the deflection of the leading end portion of the photographic paper 10, thus causing the clip 12 to engage with the photographic paper 10.

Figure 1:
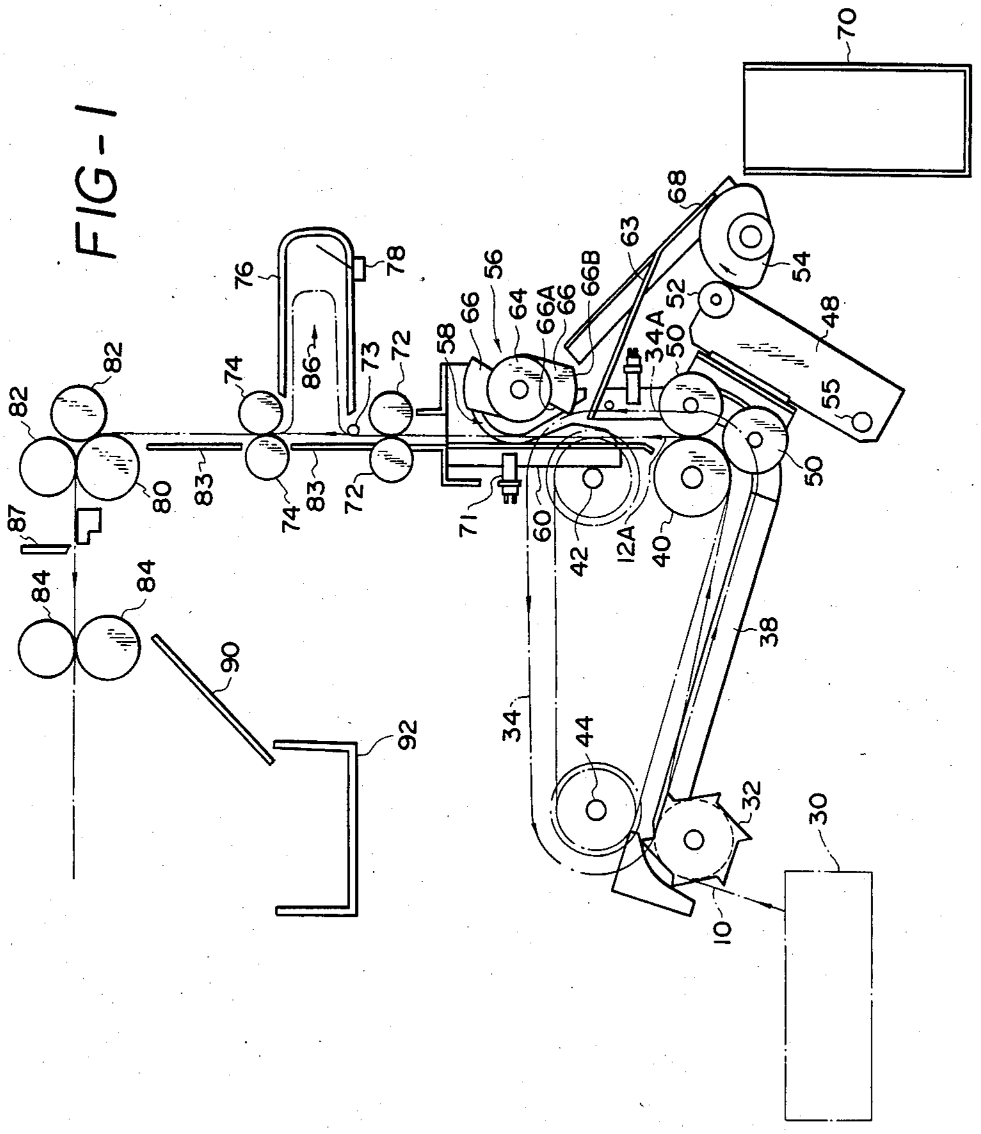
FIG. 1 is a side elevational view of one embodiment of the photosensitive material processing apparatus according to the present invention.

As shown in FIG. 1, a sprocket wheel 32 is rotatably supported on the downstream side of a printer 30 such as to transfer the clip 12 from the printer 30 to a clip driving chain 34. The clip driving chain 34 is, as shown in FIG. 2, arranged such that each of the support shafts 16 of the clip 12 is accommodated between two adjacent ones of a plurality of chain blocks 36 to thereby convey the photographic paper 10 through the clip 12.

The clip driving chain 34 is moved from the sprocket wheel 32 along a guide 38 and is then bent by a pacer roller 40 which is connected to the distal end of the guide 38 in such a manner that the chain 34 rises up a vertical section 34A. At the upper end of the vertical section 34A the chain 34 passes over a sprocket wheel 42 such as to be guided in the horizontal direction and is then passed over a sprocket wheel 44 to return to the sprocket wheel 32.

The axially intermediate portion of the pacer roller 40 is employed to retain the photographic paper 10 being guided by the clip 12. Accordingly, the moving locus of the clip 12 which is guided up the vertical section 34A is outward (remote from the pacer roller 40) of that of the vertical section 12A of the photographic paper 10 which rises vertically after being passed over the pacer roller 40. The pacer roller 40 faces a pair of press rollers 50 rotatably supported by a pivoting arm 48 which further rotatably supports a force-receiving roller 52. Accordingly, when the force-receiving roller 52 receives the driving force of a rotating cam plate 54, the pivoting arm 48 pivots about a pin 55, thus causing the press rollers 50 to come toward the pacer roller 40 so as to clamp the photographic paper 10 therebetween. Further, the pacer roller 40 is driven by the same driving means as that for the driving chain 34. Therefore, when the press rollers 50 come toward the pacer roller 40 and clamp the photographic paper 10 therebetween, a driving force is applied to the photographic paper 10 in the upward direction.

Figure 3:
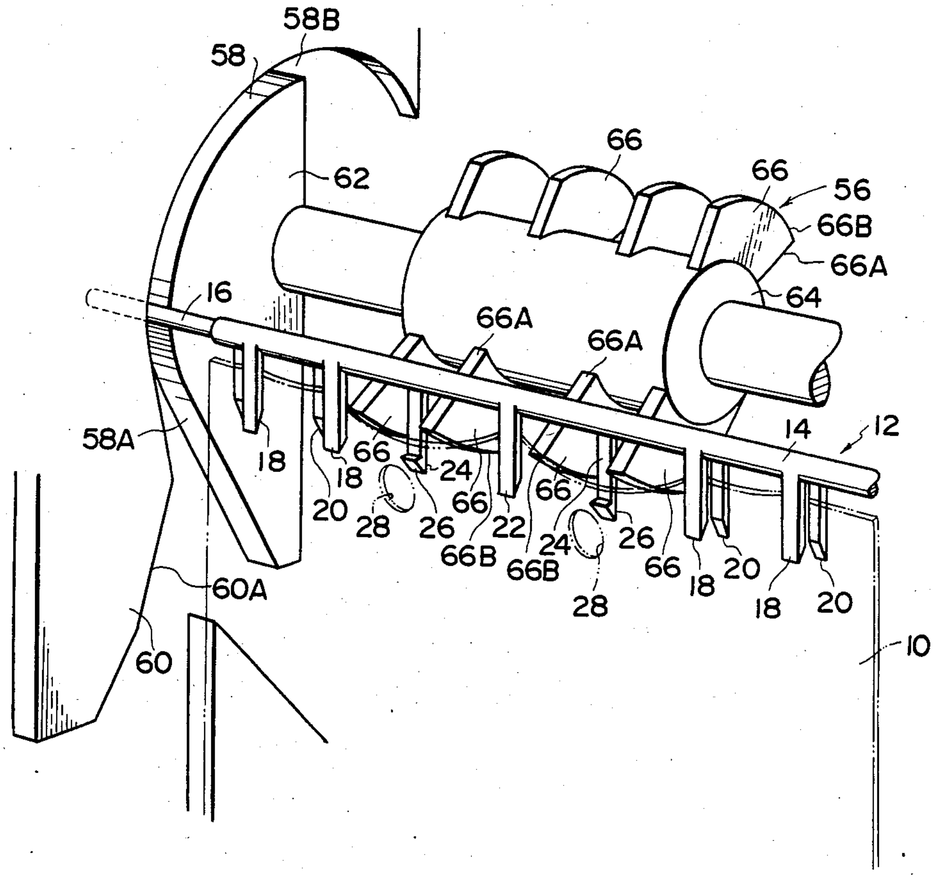
FIG. 3 is a perspective view of clip removing means employed in the apparatus shown in FIG. 1, the other side of the means being omitted.
Figure 4:
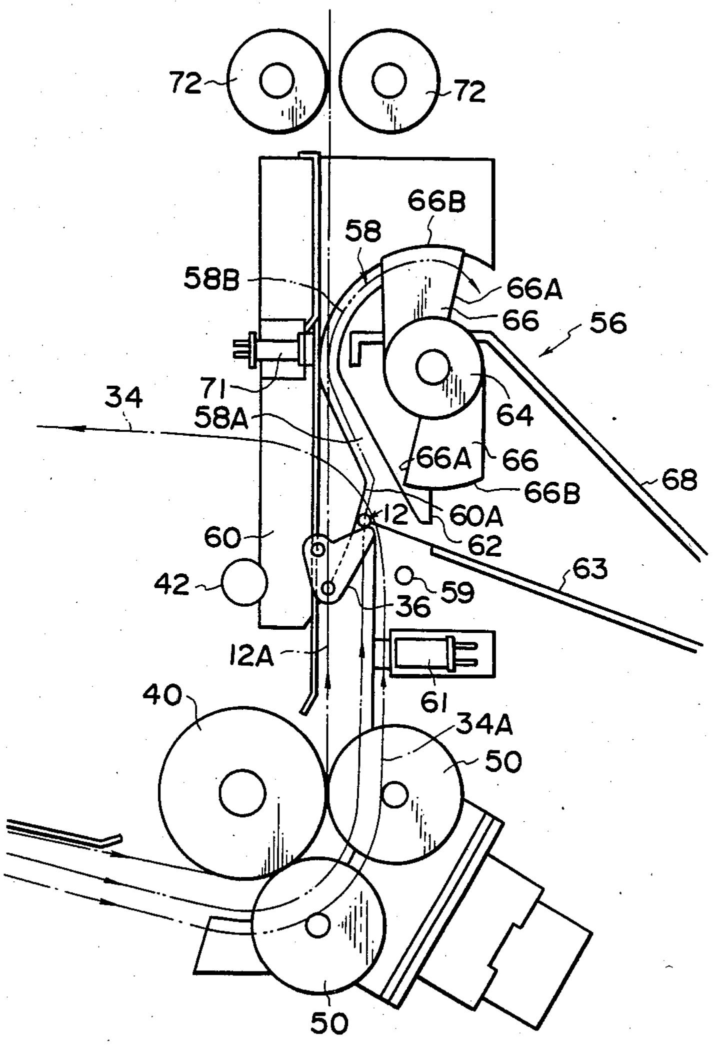
FIG. 4 is an enlarged view of an essential portion of the apparatus shown in FIG. 1.

Clip removing means 56, which is also shown in FIGS. 3 and 4, is disposed such as to face the upper end portion of the vertical section 34A of the clip driving chain 34 which extends from the pacer roller 40 to the sprocket wheel 42. The clip removing means 56 is formed with a guide groove 58 for receiving one of the support shafts 16 of the clip 12 which has reached the upper end portion of the vertical section 34A of the clip driving chain 34, the guide groove 58 being defined by a pair of guide plates 60, 62.

The guide groove 58 has a slanted portion 58A and an inverted U-shaped portion 58B. At the point where the clip driving chain 34 starts to pass over the sprocket wheel 42 in a circular path immediately subsequent to the vertical section 34A, the clip 12 is held between the clip driving chain 34 and the slanted side surface 60A of the guide plate 60 in the manner shown in FIG. 4. Thus, the slanted side surface 60A has the function of feeding the clip 12 to the slanted portion 58A of the guide groove 58. It is to be noted that the clip 12, once removed from the clip driving chain 34, is pushed up to the slanted portion 58A by the action of the photographic paper 10 which is clamped between the pacer roller 40 and the press rollers 50 such as to be propelled by the driving force.

In order to vertically suspend the clamping arms 18, 20 and the retainer arms 24, with the hooks 26 attached thereto, from the support shafts 16 and for the purpose of ensuring a smooth upward movement of the clip 12, a guide pin 59 is stretched horizontally such as to allow the clamping arms 18 and 20 and the retainer arms 24 with the hooks 26 to abut against it. Further, a detector such as a photosensor 61 for detecting the passage of the clip 12 is disposed below the guide pin 59, whereby the press rollers 50 are moved toward the pacer roller 40 when a predetermined period of time has elapsed after the passage of the clip 12 has been detected.

A slanted chute 63 is disposed below the slanted portion 58A of the guide groove 58. Thus, when a clip 12 which is not engaged with the photographic paper 10 is fed to the slanted portion 58A, the clip 12 is discharged through the chute 63. More specifically, if a clip 12 which is not attached to any photographic paper 10 is being fed in that state by the driving chain 34 as the result of an erroneous operation in a preceding step and is then removed from the driving chain 34 at the upper end of the vertical section 34A, it is not possible for the clip 12 to enter the slanted portion 58A of the guide groove 58 since the clip 12 is not followed by any photographic paper and, therefore, no force is applied to the clip 12 to make it rise further. In such a case, the clip 12 slides down the slanted chute 63 under its own weight and is discharged.

The slanted portion 58A of the guide groove 58 has its upper end communicated with the inverted U-shaped portion 58B, thereby allowing the photographic paper 10 to be disposed on the rise section 12A when the clip 12 is rising.

The guide plate 62 rotatably supports a rotating shaft 64, from which four rotating arms 66 project in such a manner that they are equally spaced in the axial direction of the rotating shaft 64. Each of the rotating arms 66 has a straight portion 66A extending in the radial direction of the rotating shaft 64 and a circular portion 66B which is formed about the axis of the rotating shaft 64. The rotating shaft 64 is disposed in such a manner that its axis is located to the side of the clip 12 as it reaches the upper end portion of the rise section 34A, whereby the rotating arms 66 bend the leading end portion of the photographic paper 10 as they rotate in the manner shown in FIG. 3.

This operation will be described hereinunder in detail. When the rotating arms 66 rotate, the straight portions 66A of two adjacent rotating arms 66 respectively bend the portion of the photographic paper 10 between the press arm 22 and one of the retainer arms 24 and the portion between the retainer arm 24 and the adjacent clamping arm 18 in the direction in which the photographic paper 10 separates from the hook 26 of the retainer arm 24, that is, the direction of the thickness of the photographic paper 10, thus causing the leading end portion of the photographic paper 10 to be deflected. As a result, the openings 28 separate from the associated hooks 26. As the rotating shaft 64 further rotates, the straight portions 66A raise the clip 12 along the inverted U-shaped portion 58B of the guide groove 58 until the clip 12 is turned over and falls by its own weight. A chute 68 is provided to receive the falling clip 12, and a clip deposit box 70 is disposed such as to face the lower end portion of the chute 68.

A detector for detecting a clip, for example, a photosensor 71, is disposed in the vicinity of the junction between the slanted portion 58A and the inverted U-shaped portion 58B of the guide groove 58. The arrangement is such that the rotating shaft 64 is rotated when the photosensor 71 detects the passage of the clip 12.

A pair of moisture-absorbing rollers 72 are disposed above the clip removing means 56. The moisture-absorbing rollers 72 have moisture-absorbing members attached to their respective surfaces so as to absorb the moisture which may be contained in the photographic paper 10 which is moved while being clamped between the rollers 72. The moisture-absorbing rollers 72 momentarily come into contact with each other in response to a signal from the photosensor 71, thereby absorbing the moisture which may be contained in the openings 28 at the leading end of the photographic paper 10.

A guide roller 73 and a pair of guide rollers 74 are disposed above the moisture-absorbing rollers 72. Further, a U-shaped buffer loop guide 76 is disposed between the guide roller 73 and the guide rollers 74. The buffer loop guide 76 allows the portion of the photographic paper 10 between the guide roller 73 and the guide rollers 74 to be bent in the direction of the arrow 86 along the inside of the buffer loop guide 76, thereby absorbing any speed difference between the printing operation and the cutting operation. The buffer loop guide 76 is provided with a loop detector, for example, a limit switch 78, for detecting a loop which is formed in the direction of the arrow 86 and has a length larger than a predetermined value.

A course changing roller 80 and press rollers 82 are disposed above the guide rollers 74 such as to bend horizontally the photographic paper 10 raised. Between the course changing roller 80 and the moisture-absorbing rollers 72, vertical guide plates 83 are disposed on the opposite side to the buffer loop guide 76.

It is to be noted that the one of the pair of guide rollers 74 which is closer to the guide plates 83 is disposed slightly lower than the other roller 74, which is closer to the buffer loop guide 76, such that the tangential line between both the rollers 74 has an angle of inclination on the order of 15°. By so doing, it is easy for the photographic paper 10 rising through the area between the moisture-absorbing rollers 72 to form a loop into the buffer loop guide 76, and it is possible for the photographic paper 10 to be properly fed into the area between the course changing roller 80 and the press rollers 82, which are disposed above the guide rollers 74.

A pair of guide rollers 84 are disposed sidewardly of the course changing roller 80. A cutter 87 is disposed between the guide rollers 84 and the course changing roller 80. The cutter 87 cuts the photographic paper 10 into individual image frames, which are then deposited into a deposit box 92 through a chute 90.

The following is a description of the operation of the embodiment arranged as above.

The photographic paper 10, which has its leading end portion engaged with the clip 12 and has previously been printed in the printer 30, is moved toward the pacer roller 40 along the guide 38 while being guided by the clip driving chain 34 in a state such as that shown in FIG. 2.

When the clip 12 is raised to the upper side of the rise section 34A of the clip driving chain 34, the photosensor 61 detects this fact, and after a predetermined period of time has elapsed, the press rollers 50 are moved toward the pacer roller 40 such as to clamp the photographic paper 10 therebetween. In consequence, the clip 12 which has been removed from the upper end of the rise section 34A is pushed up such as to enter the slanted portion 58A of the guide groove 58. When the clip 12 passing through the slanted portion 58A reaches the inverted U-shaped portion 58B, the photosensor 71 detects this fact, and the rotating shaft 64 of the clip removing means 56 is rotated clockwise as viewed in FIG. 4. In consequence, the rotating arms 66 bend the leading end portion of the photographic paper 10, thus causing the openings 28 to be disengaged from the associated hooks 26. At the same time, the clip 12 deviates from the course of the photographic paper 10 by virtue of its being guided along the clip removing means 56 and then falls into the clip deposit box 70.

The leading end portion of the upwardly moving photographic paper 10 passes through the area between the moisture-absorbing rollers 72 which are momentarily in contact with each other and reaches the course changing roller 80. After the leading end portion of the photographic paper 10 is clamped by the course changing roller 80 and the press rollers 82, the rotation of these rollers is momentarily suspended. Consequently, an intermediate portion of the photographic paper 10 is bent in such a manner that it is deflected into the buffer loop guide 76. When the loop formed by this deflection reaches a predetermined value and the limit switch 78 detects this fact, the course changing roller 80 and the press rollers 82 are driven again such as to feed the leading end portion of the photographic paper 10 into the area between the guide rollers 84, and the photographic paper 10 is cut by the cutter 87 into individual image frames. The thus cut photographic paper 10 is deposited into the deposit box 92 via the chute 90.

Unlike the conventional clip, the clip 12 which has been removed by the clip removing means 56 does not have the leading end portion of the photographic paper 10 attached to it. It is, therefore, possible for the operator to speedily and easily engage the clip 12 with the leading end portion of another photographic paper.

What is claimed is:

1. A photographic material processing apparatus in which a generally planar web of flexible photosensitive material (10) of continuous length printed with images is conveyed by means of a clip (12) which is propelled by a driving force, said clip engaging with an opening (28) formed at a leading end portion of said photosensitive material, said apparatus comprising:

(a) clip driving means (34) for engaging and pulling said clip in a longitudinal direction of said photosensitive material;

(b) clip removing means (56) for releasing said clip from its engagement with said opening by partially bending the leading end portion of said web of photosensitive material in a direction transverse to the plane thereof; and (c) photosensitive material feeding means (40, 50) for conveying said photosensitive material by applying a clamping and driving force to said photosensitive material after said clip has been removed from said clip driving means, whereby said clip is automatically removed from said photosensitive material and said photosensitive material alone is fed to a subsequent step.

2. A photosensitive material processing apparatus according to claim 1, wherein said clip removing means includes a guide passage (58) for guiding said clip out of a clip conveying locus of said clip driving means.

3. A photosensitive material processing apparatus according to claim 2, wherein, in the state in which said clip, which has been removed from said clip driving means, reaches said clip removing means, an intermediate portion of said photosensitive material is clamped by selectively engageable rollers (40, 50) to apply a conveying force and continue the feeding of said photosensitive material.

4. A photosensitive material processing apparatus according to claim 2, wherein said guide passage is constituted by a guide groove which guides said clip by accommodating both end portions (16) of said clip.

5. A photosensitive material processing apparatus according to claim 4, wherein said guide groove has an inverted U-shaped portion (58B) which serves as a guide for said clip which has been removed from said photosensitive material.

6. A photosensitive material processing apparatus according to claim 3, wherein said clip removing means is provided with a rotating arm (66) for removing said clip from said photosensitive material, said rotating arm being mounted on a shaft (64) which is disposed proximate but laterally offset from both said clip which has been removed from said clip driving means and the leading end portion of said photosensitive material.

7. A photosensitive material processing apparatus according to claim 6, wherein said rotating arm includes a circular portion (66B) for bending said photosensitive material and a straight portion (66A) for removing said clip from said photosensitive material and for feeding said removed clip along said guide passage, respectively.

8. A photosensitive material processing apparatus according to claim 1, further comprising a slanted chute (63) provided on said clip removing means to discharge any empty clip which is not attached to said photosensitive material and has been fed by said clip driving means, said empty clip being discharged after it has been removed from said clip driving means.

9. A photosensitive material processing apparatus according to claim 1, wherein said photosensitive material driving means is provided with a guide (76) for forming a buffer loop portion by bending an intermediate portion of said photosensitive material after said clip has been removed.

10. A photosensitive material processing apparatus according to claim 9, wherein said photosensitive material driving means is provided at its intermediate portion with a pair of rollers (74) for conveying said photosensitive material by clamping the same therebetween, these rollers being disposed such that an imaginary line connecting together the respective axes of said rollers diagonally crosses an imaginary line orthogonal to the direction in which said photosensitive material is conveyed, thereby facilitating the formation of a buffer loop portion when conveying said photosensitive material.

11. A photosensitive material processing apparatus for conveying a generally planar web of flexible photosensitive material (10) of continuous length which has been subjected to printing, said apparatus comprising:

(a) a clip (12) attached to a leading end portion of said photosensitive material, said clip being provided with clamping arms (18, 20) for clamping the leading end portion of said photosensitive material and a hook (26) which enters an opening (28) formed at the leading end portion of said photosensitive material so as to transmit a driving force to said photosensitive material;

(b) clip driving means (34) for engaging and pulling said clip in a longitudinal direction of said photosensitive material;

(c) clip removing means (56) for disengaging said hook on said clip from said opening by partially bending the leading end portion of said web of photosensitive material in a direction transverse to the plane thereof; and (d) photosensitive material feeding means for conveying said photosensitive material by applying a clamping and driving force to said photosensitive material after said clip has been removed from said clip driving means, whereby said clip is automatically removed from said photosensitive material and said photosensitive material alone is fed to a subsequent step.

12. A photosensitive material processing apparatus according to claim 11, wherein said clip includes a cylindrical portion from which said clamping arms and a arm retainer (24) project radially, said retainer arm having said hook formed at its distal end.

13. A photosensitive material processing apparatus according to claim 12, wherein said clip removing means includes a guide passage (58) for guiding said clip out of a clip conveying locus of said clip driving means.

14. A photosensitive material processing apparatus according to claim 13, wherein, in the state in which said clip, which has been removed from said clip driving means, reaches said clip removing means, an intermediate portion of said photosensitive material is clamped by selectively engageable rollers (40, 50) to apply a conveying force and continue the feeding of said photosensitive material.

15. A photosensitive material processing apparatus according to claim 12, wherein said guide passage is constituted by a guide groove which guides said clip by accommodating both end portions (16) of said clip.

16. A photosensitive material processing apparatus according to claim 11, wherein said clip removing means is provided with a rotating arm (66) for removing said clip from said photosensitive material, said rotating arm being mounted on a shaft (64) which is disposed proximate but laterally offset from both said clip which has been removed from said clip driving means and the leading end portion of said photosensitive material said rotating arm including a circular portion (66B) for bending said photosensitive material and a straight portion (66A) for removing said clip from said photosensitive material and for feeding said removed clip along said guide passage, respectively.

17. A photosensitive material processing apparatus according to claim 11, further comprising a slanted chute (63) provided on said clip removing means to discharge any empty clip which is not attached to said photosensitive material and has been fed by said clip driving means, said empty clip being discharged after it has been removed from said clip driving means.

18. A photosensitive material processing apparatus for conveying a generally planar web of flexible photosensitive material (10) of continuous length having an opening (28) formed in the vicinity of a leading end portion thereof, said apparatus comprising:

(a) a clip (12) attached to the leading end portion of said photosensitive material, said clip including a cylindrical portion from which clamping arms (18, 20) and a retainer arm (24) project, said clamping arms clamping a portion of said photosensitive material near its leading end portion, and said retainer arm having a hook (26) formed at its distal end portion, said hook entering said opening in said photosensitive material so as to retain said photosensitive material;

(b) a chain (34) for engaging and pulling said clip in a longitudinal direction of said photosensitive material;

(c) a bent guide groove (58) for accommodating each of the ends (16) of said clip for the purpose of guiding said clip out of a conveying locus of said chain;

(d) a rotating arm (66) disposed in the vicinity of said guide groove, said rotating arm having a circular portion (66B) and a straight portion (66A) for bending said web of photosensitive material in a direction transverse to the plane thereof to disengage said photosensitive material from said clip and to feed said removed clip along said guide groove, respectively;

(e) a pair of drive rollers (40, 50) for clamping an intermediate portion of said photosensitive material to continue feeding said photosensitive material after said clip is removed by said rotating arm; and (f) a roller group (72, 74) for feeding out said photosensitive material from which said clip has been removed while clamping said photosensitive material by a plurality of rollers.

19. A photosensitive material processing apparatus according to claim 18, wherein said guide groove has an inverted U-shaped portion (58B) which serves as a guide for said clip which has been removed from said photosensitive material.

20. A photosensitive material processing apparatus according to claim 18, further comprising a slanted chute (63) provided on said clip removing means to discharge any empty clip which is not attached to said photosensitive material and has been fed by said clip driving means, said empty clip being discharged after it has been removed from said clip driving means.

21. A photosensitive material processing apparatus according to claim 18, wherein said roller group includes a pair of rollers (74) disposed such that an imaginary line connecting together the respective axes of these rollers diagonally crosses an imaginary line orthogonal to the direction in which said photosensitive material is conveyed, thereby forming a buffer loop portion at an intermediate portion of said photosensitive material.

* * * * *